United States Patent [19]
Kawamata et al.

[11] 3,845,379
[45] Oct. 29, 1974

[54] CHOPPER CIRCUIT FOR D.C. MOTOR

[75] Inventors: Masaru Kawamata, Kounan; Mineo Ozeki, Ichinomiya, both of Japan

[73] Assignee: Kabushiki Kaisha Meidensha, Tokyo, Japan

[22] Filed: Sept. 28, 1973

[21] Appl. No.: 401,571

[30] Foreign Application Priority Data
Jan. 22, 1973   Japan.................. 48-10219

[52] U.S. Cl. ...................... 321/45 C, 318/345
[51] Int. Cl. ............................................ H02m 3/14
[58] Field of Search ...... 321/43, 44, 45 C; 318/345; 323/DIG. 1

[56] References Cited
UNITED STATES PATENTS

| | | | |
|---|---|---|---|
| 3,372,329 | 3/1968 | Stimel et al. | 318/345 X |
| 3,575,652 | 4/1971 | Snyder | 318/345 X |
| 3,594,629 | 7/1971 | Kawakani | 321/45 C X |
| 3,600,666 | 8/1971 | Gliever | 323/DIG. 1 |
| 3,614,586 | 10/1971 | King | 321/45 C |
| 3,619,753 | 11/1971 | Thompson | 321/45 C |
| 3,648,151 | 3/1972 | Gurwicz | 321/45 C |
| 3,763,418 | 10/1973 | Beck et al. | 321/45 C |

*Primary Examiner*—R. N. Envall, Jr.
*Attorney, Agent, or Firm*—Hans Berman; Kurt Kelman

[57] ABSTRACT

An improved chopper circuit for controlling a direct-current motor having a free-wheeling diode, comprising an oscillating circuit consisting of a series combination of a reactor and a capacitor and a switching element. A coil is serially connected to the free-wheeling diode of the motor and is magnetically connected to the reactor and transmits the energy stored thereon by the free-wheeling diode to the reactor for causing the charged voltage of the capacitor to become higher than that achieved in a prior art chopper circuit.

8 Claims, 3 Drawing Figures

CHOPPER CIRCUIT FOR D.C. MOTOR

The present invention relates to direct-current motors which are used on battery-operated electric vehicles such as fork lift trucks or powered caddie carts and, more particularly, to a chopper circuit for use with the motor of the particular nature. The direct-current motor powered by a battery under the control of a chopper circuit finds advantageous application in these vehicles because of the fact that stabilized and noise-free control of the motor can be achieved by electric signals without complicated electric components such as variable resistors. The chopper circuit used for this purpose usually comprises switching means for chopping a direct current to be supplied to the motor and a combination of a reactor and a capacitor by which the switching means is shunted. The switching means becomes conductive when a positive potential higher than a predetermined level is applied thereto and allows the supplied direct current to flow through the motor and when subjected to a negative potential of any level, it becomes non-conducting and interrupts the direct current. The positive potential to bring about the conduction state of the switching means is produced by a pulse from an external pulse generator controlled by an operator. Shortly after the switching means is thus made conducting, the negative potential is applied to the switching means because the current produced by the oscillating circuit consisting of the reactor, the capacitor and the switching means flows opposite to the direct current and overcomes the direct current. The oscillating current, denoted by $i_c$, is approximated by $$i_c \approx k (I_L + E_B \sqrt{C/L}) \sin \sqrt{1/CL}\, t,$$

Eq. 1 wherein $k$ is a constant determined by the operational characteristics of the oscillating circuit, $I_L$ is the direct current flowing through the motor (which current is assumed to be constant), $E_B$ is the voltage of the supplied direct current, $L$ is the inductance of the reactor, $C$ is the capacitance of the capacitor and $t$ is the time.

To produce the negative potential to be impressed on the switching means, the oscillating current should be made larger than the direct current supplied. Eq. 1 indicates that the oscillating current is dictated by the value of $E_b \sqrt{C/L}$. The oscillating current may be increased through use of an increased d.c. power. The voltages available from batteries used on battery operated electric vehicles are, however, limited to approximately 24 to 48 volts and, for this reason, no other choice has been available than using a capacitor having a relatively large capacitance or a reactor having a relatively small inductance so as to achieve an oscillating current of an acceptable level. However, a capacitor with a large capacitance is too costly to be incorporated into the chopper circuit of the described nature. When a reactor having a small inductance is used, the motor is not supplied with a sufficient amount of power because the conduction period is generally equal to one half of the oscillation cycle $\pi \sqrt{LC}$ of the oscillating circuit. It is, moreover, important that the oscillating current be not increased to such an extent as to overcome the direct current to be supplied to the motor, the direct current being increased as a result of the increase of the load on the motor. All these drawbacks of the chopper circuit are pronounced particularly when a relatively low voltage power source should be used or the motor should operate under varying loads.

Accordingly, it is an object of the present invention to provide an improved chopper circuit for controlling a direct-current motor in a stabilized condition and by the use of a relatively low d.c. voltage substantially independent of the amount of the load on the motor.

It is another object of the invention to provide an improved chopper circuit having an oscillating circuit capable of producing an oscillating current which is sufficient to change the polarity of a potential to be applied to the switching means without use of an increased d.c. voltage, a capacitor having a larger capacitance and a reactor having a smaller reactance.

It is still another object of the invention to provide an improved chopper circuit for controlling a direct-current motor to operate under various load conditions, which circuit is free from the influence of the change in the intensity of the direct current flowing through the motor.

As will be understood from the description to follow the chopper circuit provided by the present invention is used for the control of a motor having a free-wheeling diode whose cathode terminal is connected to the positive terminal of a d.c. power source and whose anode terminal is connected to an input terminal of the chopper circuit.

In accordance with the present invention, the chopper circuit comprises a switching element serially connected between the motor and the power source, the switching element becoming conducting when supplied with a positive potential higher than a predetermined level and non-conducting when supplied with a negative potential, a reactor serially connected reactor with a capacitor shunting the switching element, and a coil electrically connected in series with the free-wheeling diode of the motor and magnetically linked with the reactor.

Other features and preferred embodiments of the chopper circuit will become apparent from the following description taken in conjunction with the accompanying drawings, wherein.

Figure 1:
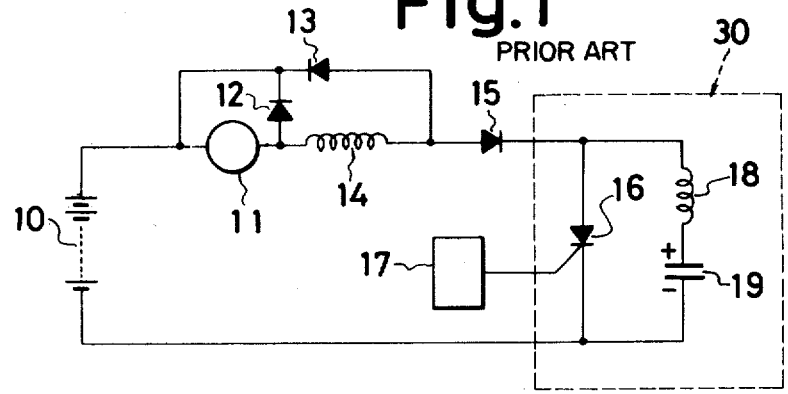
FIG. 1 is a diagram of a known chopper circuit for use with a direct-current motor having a free-wheeling diode.

Referring to FIG. 1, the prior art chopper circuit is adapted to control a direct-current motor which is powered from a d.c. power source 10 and which comprise an armature 11 and a field coil 14. A free-wheeling diode 13 shunts the armature 11 and the field coil 14 so that the current flowing through the motor is made continuous and smooth while the direct current from the power source 10 is cut off by the chopping operation to be described. The wheeling diode 13 thus provides a closed loop through the armature 11 and the field coil 14, having a cathode terminal connected to the positive terminal of the d.c. power source 10. A diode 12 may be provided for short-circuiting a counter electromotive force produced by the armature 11 when the polarity of the field coil 14 is inverted to reverse the direction of rotation of the armature 11, whereby application of an abrupt braking force on the armature 11 is avoided. A diode 15 is serially connected to the motor for the purpose of maintaining at a peak the voltage applied to a capacitor 19 intercepting the reverse oscillation while the direct current is being chopped, the capacitor 19 forming part of a chopper circuit 30. The chopper circuit 30 further comprises a silicon controlled rectifier 16 and an inductive reactor 18 serially connected to the capacitor 19. The silicon controlled rectifier 16 has an anode terminal connected to the motor through the diode 15 and a cathode terminal connected to the negative terminal of the d.c. power source 10. The rectifier 16 has a gate terminal which is connected to a pulse generator 17.

When, in operation, the silicon controlled rectifier 16 is non-conducting, the capacitor 19 is charged to the polarities shown in FIG. 1 until its voltage equals the voltage supplied from the d.c. power source 10. The silicon controlled rectifier 16 is made conducting by a gating pulse from the pulse generator 17 so that the direct current from the power source 10 starts to flow through the rectifier 16 and drives the motor. The charge stored on the capacitor 19 now flows through the silicon controlled rectifier 16 by the oscillatory action between the reactor 18 and the capacitor 19 so that the capacitor 19 is charged to polarities opposite to those indicated in FIG. 1. When the capacitor 19 is fully charged in this manner, an increasing oscillating current starts to flow in a reversed direction towards the silicon controlled rectifier 16. When the oscillating current becomes larger than the direct current supplied to the motor, a negative potential is built up so that the silicon controlled rectifier 16 is turned off. The capacitor 19 is then charged for a second time. The potential thus stored on the capacitor 19 is, however, higher than the potential initially stored on the capacitor 19, because of the energy stored on the reactor 18. The diode 15 acts to hold the voltage recharged on the capacitor 19 until the silicon controlled rectifier 16 is turned on by a next gating pulse from the pulse generator 17.

As previously mentioned, the chopper circuit 30 does not operate stably if the voltage from the d.c. power source 10 is below a certain level because the oscillating current produced by electric oscillation between the reactor 18 and the capacitor 19 may fail to overcome the direct current supplied to the motor through the silicon controlled rectifier 16. The direct current when increased due to the increase in the load on the motor can not be sufficiently diminished by means of the chopper circuit 30.

Figure 2:
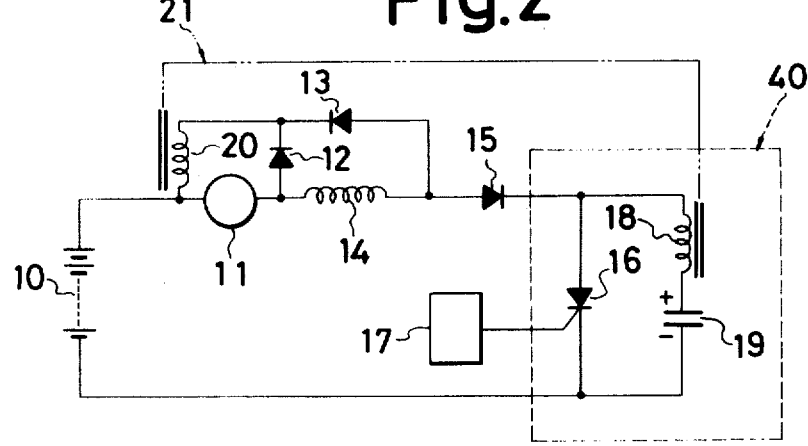
FIG. 2 is a diagram showing a first preferred embodiment of the chopper circuit according to the present invention.

FIG. 2, shows a first preferred embodiment of a chopper circuit 40 constructed to be free from the above mentioned disadvantages. In FIG. 2, those elements which have their counterparts in the arrangement of FIG. 1 are designated by like reference numerals. Where desired, the silicon controlled rectifier 16 may be replaced by any other switching element which becomes conductive when a positive potential higher than a certain limit is applied thereto and permits a current to flow therethrough in only one direction and, when subjected to a negative potential, becomes non-conducting. The chopper circuit 40 is distinguished from the chopper circuit 30 of prior art in that the chopper circuit 40 has a coil 20 which is magnetically connected to the reactor 18 through a magnetic linkage, such as an iron core 21, and which is serially connected to the diode 13.

When, in operation, the silicon controlled rectifier 16 is non-conducting and the direct current supplied from the d.c. power source 10 is chopped, a free-wheeling current flows through the closed circuit of the armature 11, the field coil 14 and the diode 13. The free-wheeling current also flows through the coil 20 which is connected in series with the diode 13. When the silicon controlled rectifier 16 is in a conducting state and the potential on the capacitor 19 is on the point of flowing through the rectifier 16 so as to reversely charge the capacitor 19 to the polarities opposite to those shown in FIG. 2, the free-wheeling current from the coil 20 acts on the reactor 18 through the magnetic linkage 21 and charges the capacitor 19 to the polarities opposite to those shown in FIG. 2. The capacitor 19 is thus charged to a higher voltage for the next oscillating current than that of the capacitor 19 shown in FIG. 1. The energy stored in the coil 20 by the free-wheeling current is thus transmitted to the capacitor 19. Since the discharge voltage of the capacitor 19 is higher than that achieved in the preceding cycle, the oscillating current issuing from the capacitor 19 to overcome the direct current flowing through the silicon controlled rectifier 16 becomes larger than the current which is given by Eq. 1.

The chopper circuit 40 is thus characterized in that the direct current can be chopped in stable conditions even when the chopping circuit is subjected to an increasing load, because the free-wheeling current increases in response to an increase in the load, so that the energy transmitted to the capacitor 19 also increases to provide an increased oscillating current.

The coil 20 may be of a limited capacity because the free-wheeling current flows through the coil 20 only during the periods in which the silicon controlled rectifier 16 is in a non-conducting state.

Figure 3:
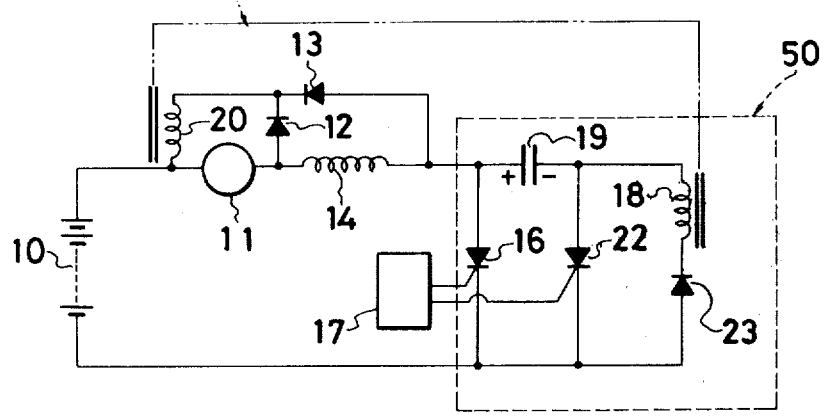
FIG. 3 is a diagram showing a second preferred embodiment of the chopper circuit according to the present invention.

In FIG. 3, there is illustrated another preferred embodiment of the present invention. The capacitor 19 is connected to the anode terminal of the silicon controlled rectifier 16 and the reactor 18 is connected to the cathode terminal of the rectifier 16. A second silicon controlled rectifier 22 is supplied with a trigger pulse from the pulse generator 17. The negative terminal of the reactor 18 is connected to a cathode terminal of a diode 23. The reactor 18, the capacitor 19, the silicon controlled rectifiers 16 and 22 and the diode 23 constitute a chopper circuit 50.

The chopper circuit 50 is controlled by two kinds of trigger pulses supplied from the pulse generator 17. The pulse generator 17 may be a single unit having two output terminals or have two separate units each having one output terminal. When the rectifier 16 is non-conducting, the other silicon controlled rectifier 22 is in a conduction state so that the capacitor 19 is charged to the polarities shown in FIG. 3 through the d.c. power source 10, the armature 11, the field coil 14, and the silicon controlled rectifier 22. When a gating pulse is supplied from the pulse generator 17 to the silicon controlled rectifier 16 which is accordingly made conducting direct current flows from the power source 10 to the motor and to the silicon controlled rectifier 22 whilst the capacitor 19 starts to discharge. The discharge current flows through the diode 23 and the reactor 18 so that the capacitor 19 is re-charged to the polarities opposite to the polarities shown in FIG. 3. As mentioned in connection with FIG. 2, the re-charged voltage of the capacitor 19 is augmented by the reactor 18 which is magnetically connected to the coil 20 through the magnetic linkage 21. Immediately after the discharge current has started to flow, the silicon controlled rectifier 22 becomes non-conducting because a negative potential is applied thereto. Since the diode 23 prevents discharging of the re-charged capacitor 19, the oscillating current does not flow and the period of the direct current flowing through the silicon controlled rectifier 16 is not affected by the time constant of the oscillating circuit consisting of the capacitor 19 and the reactor 23. When the silicon controlled rectifier 22 is made conducting by the gating pulse from the pulse generator 17, the charge stored on the capacitor 19 flows through the rectifier 22 towards the rectifier 16 which is accordingly made non-conducting.

The advantage of the chopper circuit 50 resides in that the control of the period to chop the direct current to flow through the motor is achieved as desired by means of the gating signals fed to the silicon controlled rectifiers 16, 22 independent of the time constant of the oscillating circuit consisting of the capacitor 19 and the reactor 18. The reactor 18 makes the voltage of the re-charged capacitor 19 higher than that achieved by the prior art chopper circuit.

What we claim is:

1. A chopper circuit for controlling a direct-current motor having a free-wheeling diode serially connected at one end to a direct-current power source and at the other end to said chopper circuit, which chopper circuit comprises switching means serially connected at one end to said motor and at the other end to said power source, said switching means becoming conducting when subjected to a positive potential higher than a predetermined level and non-conducting when subjected to a negative potential, a combination of an inductive reactor and a capacitor serially connected to each other and shunting said switching means, and a coil electrically connected in series with said free-wheeling diode and magnetically connected to said reactor.

2. A chopper circuit as set forth in claim 1, further comprising a diode serially connected to that terminal of said reactor which is opposite to the terminal connected to said capacitor, and second switching means having operating characteristics similar to those of the first-named switching means and shunting said reactor and said diode serially connected to said terminal of said reactor.

3. A chopper circuit as set forth in claim 1, wherein said switching means comprise a silicon controlled rectifier.

4. A chopper circuit as set forth in claim 1, wherein said reactor is connected to said coil through a magnetic linkage.

5. A chopper circuit as set forth in claim 2, wherein each of the first named switching means and said second switching means comprise a silicon controlled rectifier.

6. A chopper circuit as set forth in claim 3, wherein said silicon controlled rectifier has a gate terminal connected to a pulse generator.

7. A chopper circuit as set forth in claim 4, wherein said magnetic linkage comprises an iron core.

8. A chopper circuit as set forth in claim 1, wherein said free-wheeling diode, said capacitor, and said reactor are serially connected.

* * * * *